(12) United States Patent
Park et al.

(10) Patent No.: US 8,681,912 B2
(45) Date of Patent: Mar. 25, 2014

(54) METHOD AND APPARATUS FOR ESTIMATING CHANNEL USING PHASE COMPENSATION IN WIRELESS COMMUNICATION SYSTEM

(75) Inventors: Hyo-Yol Park, Seoul (KR); Sung-Kwon Jo, Gyeonggi-do (KR); Ha-Young Yang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 565 days.

(21) Appl. No.: 12/978,820

(22) Filed: Dec. 27, 2010

(65) Prior Publication Data

US 2011/0158343 A1 Jun. 30, 2011

(30) Foreign Application Priority Data

Dec. 24, 2009 (KR) ........................ 10-2009-0131301

(51) Int. Cl.
*H03D 1/00* (2006.01)
*H04L 27/06* (2006.01)

(52) U.S. Cl.
USPC ........... 375/343; 375/232; 375/285; 375/349; 375/350; 375/367

(58) Field of Classification Search
USPC ................. 375/140–142, 147, 150, 229–232, 375/259–260, 285, 316, 340, 342–343, 346, 375/354, 359, 362, 364–368, 130
See application file for complete search history.

(56) References Cited

U.S. PATENT DOCUMENTS

| | | | |
|---|---|---|---|
| 6,510,143 B1 * | 1/2003 | Bejjani et al. ................. | 370/320 |
| 6,553,066 B1 * | 4/2003 | Pollet et al. .................... | 375/232 |
| 7,983,323 B2 * | 7/2011 | Kent et al. ...................... | 375/148 |
| 2004/0190657 A1 * | 9/2004 | Seki et al. ...................... | 375/347 |
| 2005/0265489 A1 * | 12/2005 | Chang et al. .................. | 375/340 |
| 2009/0262847 A1 * | 10/2009 | Jo .................................. | 375/260 |
| 2012/0033828 A1 * | 2/2012 | Sugiyama et al. ........... | 381/94.3 |

* cited by examiner

*Primary Examiner* — Sam K Ahn
*Assistant Examiner* — James M Perez
(74) *Attorney, Agent, or Firm* — The Farrell Law Firm, P.C.

(57) ABSTRACT

Method of estimating a channel in a wireless communication system by obtaining a channel impulse response from a pilot signal included in a received signal; estimating a timing offset with a maximum peak power value for the channel impulse response; and performing a phase compensation using the estimated timing offset and estimating a channel which is applied with the compensated phase.

14 Claims, 5 Drawing Sheets

METHOD AND APPARATUS FOR ESTIMATING CHANNEL USING PHASE COMPENSATION IN WIRELESS COMMUNICATION SYSTEM

PRIORITY

This application claims priority under 35 U.S.C. §119(a) to an application entitled "Method and Apparatus for Estimating Channel Using Phase Compensation in Wireless Communication System" filed in the Korean Intellectual Property Office on Dec. 24, 2009, and assigned Serial No. 10-2009-0131301, the entire disclosure of which is incorporated herein by reference.

BACKGROUND OF THE INVENTION

1. Field of the Invention

The present invention relates generally to a method and an apparatus for estimating a channel in a wireless communication system, and in particular, to a method and an apparatus for estimating a channel using phase compensation in a wireless communication system.

2. Description of the Related Art

Recently, various studies and research have been actively performed for the Orthogonal Frequency-Division Multiplexing (OFDM) scheme which is a used in a mobile communication system to transmit data at high speed through a wire/wireless channel. The OFDM scheme is a scheme in which data is transmitted using a multi-carrier, and a type of Multi Carrier Modulation (MCM) scheme in which a series of input symbols is converted into parallel data and each piece of this data is transmitted through a number of subcarriers which are kept in an orthogonal relationship to each other.

The OFDM scheme can be widely used in digital transmission technologies such as Digital Audio Broadcasting (DAB), digital television, Wireless Local Area Network (WLAN), Wireless Asynchronous Transfer Mode (WATM), and high-speed packet data system. The OFDM scheme had not been widely used in the past due to the complexity of its hardware, but has been recently realized as digital signal processing technologies were developed, such as Fast Fourier Transform (FFT) technology, Inverse Fast Fourier Transform (IFFT) technology, and the like.

In the OFDM system, a modulation process and a demodulation process in a transmitter and a receiver correspond to an Inverse Discrete Fourier Transform (IDFT) process and a Discrete Fourier Transform (DFT) process, respectively. These processes can be efficiently realized using the IFFT and the FFT whereby the transmitter of the OFDM system carries a sending signal on plural subcarriers through the IFFT, and the receiver receives the OFDM signal through a wireless channel and divides the received OFDM signal through the FFT.

Similar to other wireless communication systems using wireless channels, the receiver of the OFDM system estimates the impulse response of the wireless channel which represents the feature of the wireless channel from the transmitter to the receiver, and performs channel compensation on the received signal through the estimated impulse response. In general, the receiver of the OFDM system uses an equalizer such as the Zero-Forcing (ZF) scheme and the Minimum Mean Square Error (MMSE) scheme in order to compensate the channel.

The MMSE scheme is representative among the conventional channel estimation scheme described above, as is Wiener Filtering. The MMSE scheme estimates the channel using a Least Square (LS) technique, obtains a weight based on the criterion that minimizes the channel estimation error, and multiplies the weight by the LS estimation value. Therefore, it is well known as an ideal channel estimation scheme.

In the MMSE scheme, the weight is obtained as follows. First, a correlation matrix is calculated between pilot signals different from each other in the time and the frequency, adds a reciprocal number of a Signal-to-Interference and Noise Ratio (SINR) and the diagonal components in the correlation matrix, and calculates an inverse matrix of the result. Then, a correlation matrix is calculated between data to be estimated and the pilot signals, and multiplies the correlation matrix by the obtained inverse matrix in order, thereby being able to obtaining the weight.

Channel estimation using the Wiener Filtering is very effective. However, since it should continuously calculate the correlation matrix for the changing channel in order to obtain the weight as described above and calculate the inverse matrix every time, the complexity is very high. Therefore, it is difficult to use this scheme for a system in which the channel should be estimated in real time. In a scheme proposed to reduce complexity, the complexity of channel estimation using the Wiener Filtering is taken into consideration, so that a correlation matrix is obtained for a representative channel in a case of the channel estimation scheme of a base station in a system such as the Mobile WiMax. Further, the channel estimation is performed by performing an interpolation or an average in the frequency axis and ID N-tap sliding Wiener filtering in the time axis.

However, in the channel estimation scheme in the Mobile WiMax described above, the phases are shifted for each frequency when there are plural timing offsets. Therefore, the performance of channel estimation may be degraded when interpolation or averaging is performed. Further, even the Wiener Filtering in the time axis is degraded due to the complexity in calculation of the inverse matrix and due to discrepancies between the correlation matrixes of the actual and representative channels. Therefore, there is required a channel estimation scheme which is able to prevent the degradation in performance due to the interpolation and the average in the channel estimation and to solve the complexity of the Wiener filter.

SUMMARY OF THE INVENTION

Accordingly, the present invention has been made to solve the above-mentioned problems occurring in the prior art, and the present invention provides a method and an apparatus for estimating a channel using phase compensation in a wireless communication system.

Further, the present invention provides a method and an apparatus for estimating a channel with efficiency in reduced complexity in a wireless communication system.

In accordance with an aspect of the present invention, there is provided a method of estimating a channel in a wireless communication system, the method including obtaining a channel impulse response from a pilot signal included in a received signal; estimating a timing offset with a maximum peak power value for the channel impulse response; and performing a phase compensation using the estimated timing offset and estimating a channel which is applied with the compensated phase.

The method of estimating a channel in a wireless communication system may further include outputting a channel estimation value in which the compensated phase is restored to the original phase.

In accordance with another aspect of the present invention, there is provided an apparatus for estimating a channel in a wireless communication system, the apparatus including an Inverse Discrete Fourier Transform (IDFT) unit which obtains a channel impulse response from a pilot signal which is included in a received signal; a timing offset estimator which estimates a timing offset with a maximum peak power value for the channel impulse response; a timing offset compensator which performs a phase compensation using the estimated timing offset; and a moving averaging unit which performs a channel estimation to which the compensated phase is applied.

The apparatus for estimating a channel in a wireless communication system may further include a timing offset decompensator which outputs a channel estimation value in which the compensated phase is restored to the original phase.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description, a detailed description of known functions and configurations incorporated herein will be omitted to avoid obscuring the subject matter of the present invention. Hereinafter, embodiments of the present invention will be described with reference to the accompanying drawings.

The described embodiments of the present invention are provided to solve the complexity of Wiener filtering in the conventional channel estimating method and to solve degradation in performance caused by the interpolation and averaging scheme in the channel estimation. For this purpose, the embodiments of the present invention provide a method of estimating a channel, in which a main phase compensation is first performed for compensating for the shifted phases of each frequency when the channels are estimated, and then a simple moving average is performed in a frequency domain.

Further, the embodiments of the present invention are designed to achieve a channel estimating performance close to an ideal Wiener filtering performance under all channels by applying a variable window size on the channel estimation according to at least one of Carrier to Interference Noise Ratio (CINR) of a channel on the channel estimation, Root Mean Square (RMS) delay and frequency selectivity.

In the embodiments of the present invention, a receiver performs an IDFT on a pilot symbol in the frequency axis in a user allocation unit after performing an FFT on a receiving signal, and estimates a timing offset for obtaining a channel response to a main path of the receiving signal in a time axis. Then, the receiver performs a phase compensation on frequencies using the estimated timing offset, determines a window size according to channel environments, performs a moving average for removing interference on the channel estimation, and then compensates the phase inversely in the frequency domain, thereby estimating the channel.

Hereinafter, assuming that the channel estimating operation of a base station is in an uplink transmission from a User Equipment (UE) to the base station in an Long Term Evolution (LTE) system, the embodiment of the present invention will be described. However, it should be noticed that the present invention can also be applied to a downlink transmission similarly to the uplink transmission as long as the system transmits the pilot signal through the whole frequency band such as a pilot structure of Physical Uplink Shared Channel (PUSCH) in the LTE system.

Figure 1:
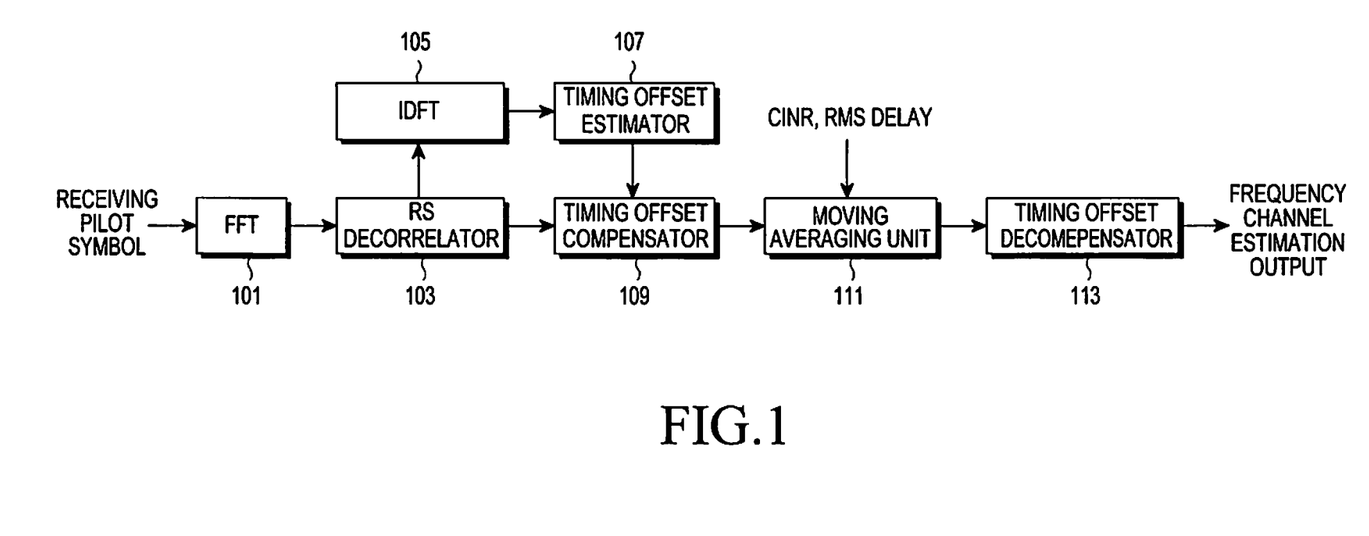
FIG. 1 is a block diagram illustrating the configuration of an apparatus for estimating a channel in a wireless communication system according to an embodiment of the invention.

FIG. 1 is a block diagram illustrating the configuration of an apparatus for estimating a channel in a wireless communication system according to an embodiment of the invention.

The channel estimating apparatus illustrated in FIG. 1 includes an RS decorrelator 103, an IDFT 105, a timing offset estimator 107, a timing offset compensator 109, a moving averaging unit 111, and a timing offset decompensator 113.

A received pilot signal in FIG. 1 is converted into a signal in the frequency domain through the FFT 101. The pilot signal is referred to as a Reference Signal (RS). The RS decorrelator 103 generates the same sequence as that of the reference signal transmitted from a transmitter, and performs a decorrelation in which the generated sequence is multiplied by the reference signal to obtain a Channel Frequency Response (CFR). As for the reference signal, a predetermined sequence between the transmitter and the receiver can be used.

The operation of the RS decorrelator will be described as an example of the uplink of the LTE system among the high-speed packet data systems. The channel estimating apparatus of the base station performs decorrelation by multiplying the reference signal which is transmitted through a Resource Block (RB) used by the UE and the conjugate complex number of the reference signal for each subcarrier. Assuming that if transmitting signals of two UEs are subjected to the Collaborate Spatial Multiplexing (CSM) and the two UEs are denoted as UE1 and UE2, the channel estimating apparatus of the base station performs decorrelation using the reference signal of the UE1 and does not perform the decorrelation using the reference signal of the UE2.

Figure 3:
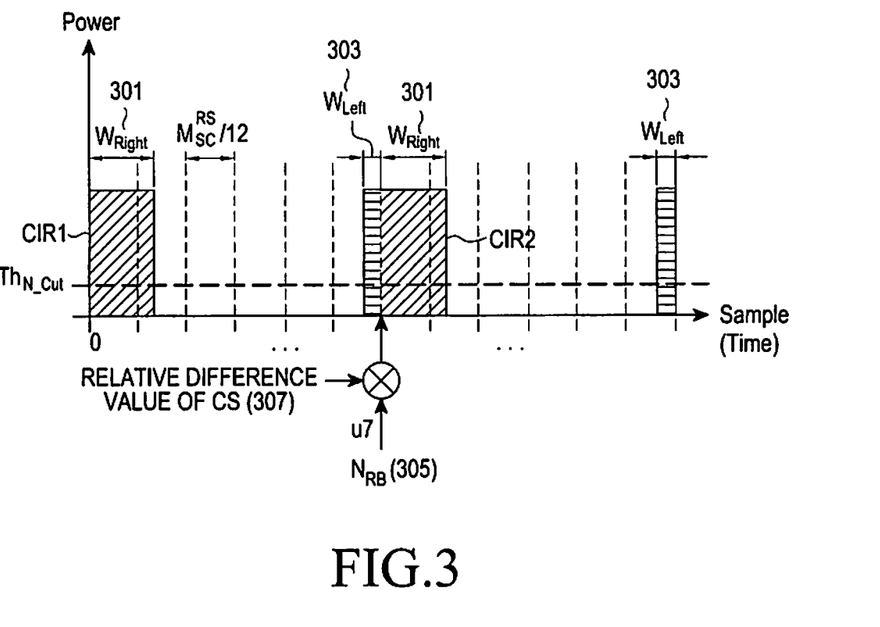
FIG. 3 is a diagram illustrating an impulse response section of an effective channel when channel estimation is performed for each of UEs.

Herein, the reason why the decorrelation is performed by using the reference signal of the UE1 instead of using the reference signal of the UE2 is that the same sequences having a relative time difference between the UE1 and the UE2 are cyclically shifted in the time domain and the resultant signals are used as the reference signals, respectively. Therefore, the decorrelation is performed using the reference signal of the UE1, and the IDFT is performed on the channel frequency response output as a result of the decorrelation. As illustrated in FIG. 3, the Channel Impulse Responses (CIR) of the UE1 and the UE2 in the time domain can be observed on the basis of the UE1.

FIG. 3 is a diagram illustrating an impulse response section of an effective channel when the channel estimation is performed for each UE. Referring to FIG. 3, the CIR1 section of the UE1 begins from 0-th sample in the IDFT result, and the CIR2 section of the UE2 is determined by a relative difference between the cyclic shifts of the UE1 and the UE2.

In FIG. 1, the IDFT 105 converts the Channel Frequency Response (CFR) output from the RS decorrelator 103 into a channel response in the time domain and outputs the channel impulse response. The OFDM system performs the IDFT with the same number of points as that of the FFT.

The timing offset estimator 107 sets the left effective window section ($W_{Left}$: 303) and the right effective window section ($W_{Right}$: 301) on the basis of the channel impulse responses CIR1 and CIR2 of the UE1 and the UE2 which are observed from the output of the IDFT 105. Further, the timing offset estimator 107 finds the largest power peaks in the corresponding effective window sections of the UE1 and the UE2, respectively. In order to take the estimation error in the timing offset into consideration, the left and right effective window sections 303 and 301 are set respectively. In FIG. 3, $M_{SC}^{RS}$ denotes the point of the IDFT 105, $M_{SC}^{RS}/12$ denotes the sample unit for estimating the main path to be described, when 12 subcarriers are allocated to one resource block RB, which has the value equivalent to $N_{RB}$.

Further, the timing offset estimator 107 in the embodiment of the present invention divides the section of the UE1 into the left effective window section ($W_{Left}$: 303) and the right effective window section ($W_{Right}$: 301) on the basis of the zero in FIG. 3, and multiplies the number $N_{RB}$ 305 of the resource block RB by the relative time difference between the reference signals of the UE1 and the UE2, that is, the relative difference value 307 between the cyclic shifts CS, thereby finding the point for dividing the left effective window section ($W_{Left}$: 303) and the right effective window section ($W_{Right}$: 301) of the UE2.

When the cyclic shift value of the reference signal in the UE1 is denoted by CS1 and the cyclic shift value of the reference signal in the UE2 is denoted by CS2, assuming that 12 subcarriers are allocated to one resource block RB, the relative difference value $CS_{diff}$ is calculated by Equation (1) below.

If CS2−CS1≥0, then $CS_{diff}$=CS2−CS1,

If CS2−CS1<0, then $CS_{diff}$=12+(CS2−CS1)　　(1)

Accordingly, the timing offset estimator 107 estimates the signal path with the largest peak value for each UE as the most dominant signal path for estimating the channel, and outputs a sample index for the estimated main path. Herein, the sample index of UE0 is counted by increasing one by one on the basis of zero, the sample index of UE1 is counted by increasing one by one on the basis of $CS_{diff}*N_{RB}$.

When the CINR of the channel is very low, the timing offset estimator 107 may not find out the peak value in the estimation of the main path due to the noise signals. Therefore, in the embodiment of the present invention, a threshold value $Th_{N\_cut}$ is predetermined which has a value greater than an average noise power. Further, when the peak value of the main path estimated from the timing offset estimator 107 exceeds the threshold $Th_{N\_Cut}$, the main path is determined as the effective main path and the corresponding index is output. When estimated peak value of the main path is not greater than the threshold $Th_{N\_cut}$, the main path is determined as an ineffective path and the corresponding index is set to 0 and output. Therefore, the scheme for determining the main path using the threshold $Th_{N\_cut}$ can be selectively performed.

Assuming the uplink of the LTE system is in one embodiment, the channel impulse response CIR can be observed by performing the IDFT on the points of which the number is 12 times the number of the resource blocks for the channel frequency response CFR output from the RS decorrelator 103, that is, $M_{SC}^{RS}=12N_{RB}$. When the uplink signals of two UEs are subjected to the CSM and transmitted, the channel impulse responses CIR1 and CIR2 of the two UEs are observed as illustrated in FIG. 3, where, the timing offset estimator 107 sets the effective window sections 301 and 303 for detecting the main path for each UE. Further, the timing offset estimator 107 outputs the sample index of the main path with the peak value in the effective window section. Therefore, as illustrated in FIG. 3, when the signals of two UEs are subjected to the CSM and transmitted, the timing offset estimator 107 outputs the indexes $n_{max,1}$ and $n_{max,2}$ of the main paths for the respective UEs as the estimation result.

In FIG. 1, the timing offset compensator 109 performs phase compensation on the output of the FFT 101 each subcarrier using the timing offset estimated from the timing offset estimator 107, that is, the index of the main path. The timing offset compensator 109 performs main phase shift compensation on the channel frequency response $\tilde{r}_k^{r,RS}$ for the subcarrier of the decorrelated reference signal which is stored in the RS decorrelator 103 using each of the indexes $n_{max,1}$ and $n_{max,2}$ of the main paths for the respective UEs output from the timing offset estimator 107, as by Equation (2) below.

$$\tilde{r}_k^{RS} = \tilde{r}_k^{r,RS} e^{j2\pi k n_{max}/M_{SC}^{RS}}, \quad (2)$$
$$0 \le k < M_{SC}^{RS}$$

In Equation (2), k denotes the index of the subcarrier, $M_{SC}^{RS}$ denotes the point of the IDFT 105, $n_{max}$ denotes the index of the main path, $\tilde{r}_k^{r,RS}$ denotes the channel frequency response before the phase compensation, and $\tilde{r}_k^{RS}$ denotes the channel frequency response after the phase compensation.

Figure 4A:
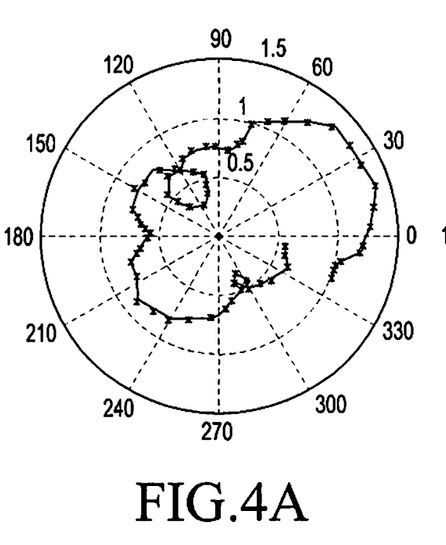
FIG. 4 is a diagram illustrating a simulation result of phase variation between subcarriers before and after a timing offset is compensated using a channel estimating method according to an embodiment of the invention.
Figure 4B:
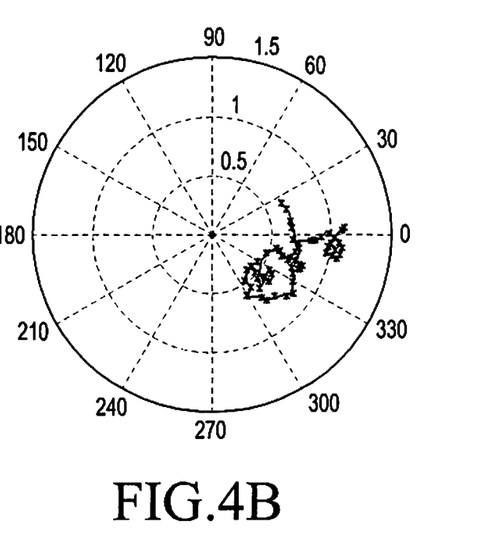

According to an aspect of the present invention, when the main phase shift compensation is performed on the estimated main path by the timing offset compensator 109, the phase difference between the subcarriers is reduced as illustrated in FIG. 4. Therefore, when the moving average is calculated in channel estimation, the canceled degree of the channel value becomes small and thus the channel can be estimated with much accuracy. FIG. 4A illustrates a simulation result of phase variation between subcarriers before the timing offset is compensated using a channel estimating method, and FIG. 4B illustrates the simulation result after the timing offset is compensated, according to an embodiment of the invention. In FIGS. 4A and 4B, it is assumed that the channel is the 6 RB, Extended Typical Urban (ETU) channel. Herein, referring to FIG. 4B after the timing offset compensation, it can be seen that the phase variation is significantly reduced in the channel estimation.

Further, the moving averaging unit 111 determines the window size for estimating the channel using at least one of the CINR, the RMS delay of the channel and the frequency selectivity for the compensation result of the timing offset compensator 109, calculates the moving average and performs noise elimination and the channel estimation. Herein, the parameters representing the CINR, the channel RMS delay and the frequency selectivity can provide the values estimated through a controller (not shown).

According to one embodiment of the present invention, after the timing offset compensator 109 performs compensation, the moving averaging unit 111 performs compensation using the window, as equation 3 below, in which $N_{win}$ taps are used for the channel frequency response $\tilde{r}_k^{RS}$, and then calculates the moving average of the channel frequency response $\tilde{r}_k^{RS}$, thereby performing noise elimination and channel estimation in the frequency domain.

$$\hat{h}(k) = \frac{1}{N_w} \sum_{i=0}^{N_{win}-1} w_i \tilde{r}_{k-\lfloor N_{win}/2 \rfloor+i}^{RS} \quad 0 \le k < M_{sc}^{RS} \quad (3)$$

$$w_i = \begin{cases} 1 & \text{if } k - \lfloor N_{win}/2 \rfloor + i \ge 0 \text{ or } k - \lfloor N_{win}/2 \rfloor + i \le M_{sc}^{RS} \\ 0 & \text{else} \end{cases}$$

$$N_w = \sum_{i=1}^{N_{win}} w_i$$

In Equation (3), k denotes the index of the subcarrier, $N_{win}$ denotes the window size, $\hat{h}(k)$ denotes the channel estimation result calculated through the moving average, and $w_i$ denotes a weight which is used for calculating the window size and the channel estimation value. Herein, i denotes a dummy variable in the unit of the subcarrier, $M_{sc}^{RS}$ denotes the IDFT size, and $N_w$ denotes the number of samples used for the moving average.

In FIG. 1, since the size (number) of the subcarriers allocated to the UE in the windowing process for calculating the moving average is less than the window size $N_{win}$ or the location of the subcarrier to be estimated does not exist, the moving averaging unit 111 may not calculate the average of the entire tap length of the window. As in Equation (3), the cut-off portion may not calculate the moving average by assigning that portion to the weight $w_i$ of zero. Further, the moving averaging unit 111 can change the weight $w_i$ on the basis of at least one of the CINR, the channel RMS delay, and the frequency selectivity.

The procedure for calculating the moving average in the moving averaging unit 111 is as follows.

First, the window size $N_{win}$ is determined, using the input CINR and the frequency selectivity.

For example, the window size $N_{win}$ is determined to be a greater value as the CINR becomes smaller and the frequency selectivity becomes smaller. On the contrary, the window size $N_{win}$ is determined to be a smaller value as the CINR becomes greater and the frequency selectivity becomes greater.

Then, the range of $0 \le k < M_{sc}^{RS}$ for the index k of the subcarrier is set and the weight $w_i$ for each i using the given index k of the subcarrier and the window size $N_{win}$ (here, $1 \le i \le N_{win}$) is obtained. $N_w$ is obtained by adding the weight $w_i$ and the window size $N_{win}$. The moving average is obtained using the weight $w_i$ and the window size $N_w$ corresponding to the number of the window size $N_{win}$.

Thereafter, the timing offset decompensator 113 illustrated in FIG. 1 outputs the channel estimation result, in which the phase is restored as it was, for the channel estimated value in which the timing offset, that is, the phase is compensated. Specifically, the timing offset decompensator 113 compensates the channel estimation value inversely using equation 4 and the index $n_{max}$ of the main path for each UE estimated through the timing offset estimator 107.

$$\hat{h}'(k) = \hat{h}(k) e^{-j2\pi k n_{max}/M_{sc}^{RS}} \quad (4)$$

In Equation (4), $\hat{h}'(k)$ denotes the channel estimation value in which the phase is restored as it was, and $\hat{h}(k)$ denotes the channel estimation value before the phase is restored. Herein, the reason that the phase for the channel estimation value is restored as it was is to make the same channel environment as the original channel environment to which the data except for the reference signal in the sending signals of the UE is subjected.

Hereinafter, the channel estimation method in a wireless communication system according to the embodiment of the present invention will be described with reference to FIGS. 1 and 2.

In the embodiment illustrated in FIG. 1 as described above, the channel estimation apparatus is described as an example which is included in the receiver of the base station in the LTE system. However, as long as a system transmits the pilot signal through the whole frequency band, the present invention can be applied to the uplink as well as to the downlink.

Figure 2:
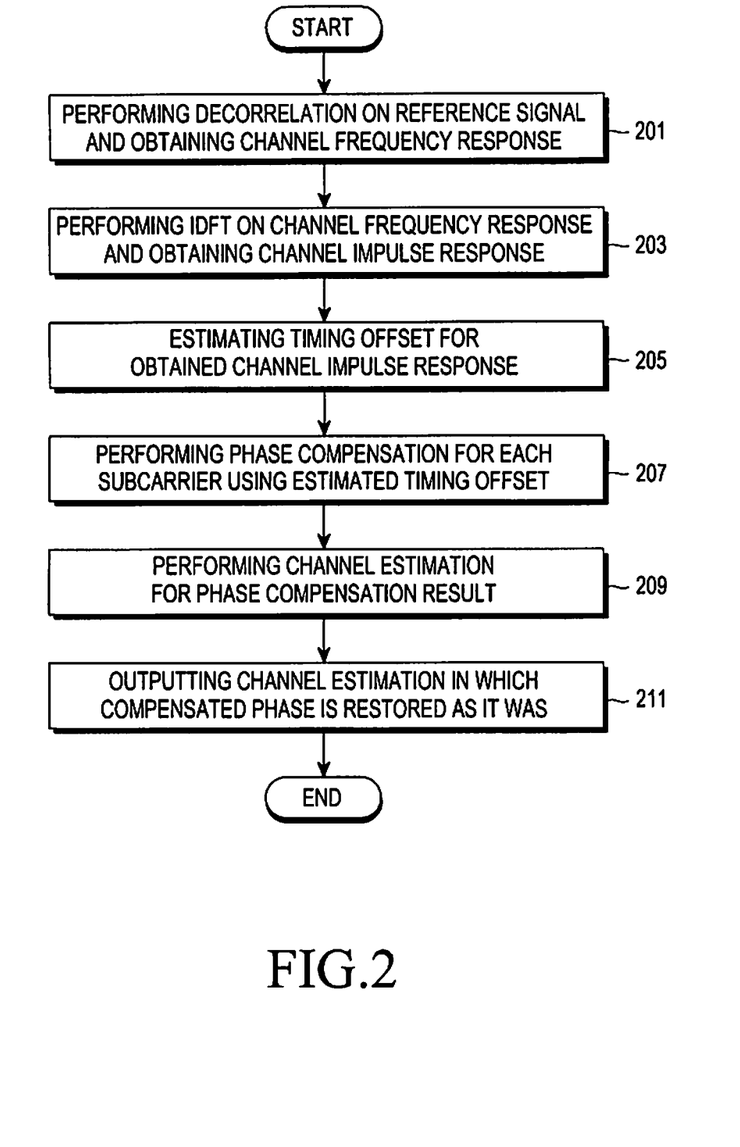
FIG. 2 is a flowchart illustrating a method of estimating a channel in a wireless communication system according to an embodiment of the invention.

Referring to FIG. 2, the channel estimation apparatus of the receiver receives a signal which includes the pilot signal, that is, the reference signal through a wireless channel. At Step 201, the RS decorrelator 103 of the channel estimation apparatus obtains the channel frequency response by performing decorrelation on the reference signal. At Step 203, the IDFT 105 obtains the channel frequency response by performing the IDFT on the channel frequency response output from the RS decorrelator 103. At Step 205, the timing offset estimator 107 estimates the index of the main path with a maximum peak power from the obtained channel frequency response. Herein, the main path with the maximum peak power can be estimated by setting the effective window section. In the embodiment illustrated in FIG. 1, the main path is estimated for each UE on an assumption that there are plural UEs in the LTE system. However, in a case of the system in which a sending signal cannot be subjected to the CSM, the effective window section may be set for one transmitter and the main path with the maximum peak power may be estimated.

While not illustrated in FIG. 2, if the CINR is very low at Step 205, because the peak value may be found in error due to the noise signals when estimating the main path, the threshold value $Th_{N\_Cut}$ is set to be higher than the average noise power. Further, if the peak value of the estimated main path exceeds the threshold value $Th_{N\_Cut}$, the peak value is determined as the effective main path and the corresponding index is output. If the peak value of the estimated main path does not exceed the threshold value $Th_{N\_Cut}$, it may be determined as the ineffective path. Herein, the average noise power may use the value estimated through a controller (not shown).

At Step 207, the timing offset compensator 109 illustrated in FIG. 1 performs phase compensation on each subcarrier using the estimated timing offset, that is, the index of the main path with the peak power value. Herein, in the phase compensation for each subcarrier, a scheme is employed in which a main phase shift is performed on the channel frequency response to the subcarrier of the decorrelated reference signal which is stored in the RS decorrelator 103.

At Step 209, the moving averaging unit 111 obtains a moving average by adjusting the window size $N_{win}$ in a variable manner in Equation 3 using at least one of the CINR, the channel RMS delay, and the frequency selectivity for the phase compensation result, thereby performing noise elimination and the channel estimation in the frequency domain. Herein, the parameters representing the CINR, the channel RMS delay and the frequency selectivity can provide the values estimated through a controller (not shown). At Step 211, the timing offset decompensator 113 restores the phase of the channel estimation value, as it was, which is reflected with the phase compensated through the timing offset compensator 109, and outputs the phase as the channel estimation result.

In the embodiment of the present invention, after the timing offset compensator 109 performs compensation, the moving averaging unit 111 performs compensation using the window in which $N_{win}$ taps are used for the channel frequency response, and then calculates the moving average of the channel frequency response, thereby performing noise elimination and the channel estimation in the frequency domain.

Hereinafter, a simulation result of the channel estimation method according to the embodiment of the present invention will be described with reference with FIGS. 5 to 7.

As is well known, various schemes can be employed for the channel estimation using the reference signal. There is the Wiener filtering scheme as an ideal scheme, and there is a scheme for using a moving average in order to reduce the complexity. Further, after the IDFT is performed in the channel estimation apparatus, a window may be used in the time domain.

Figure 5:
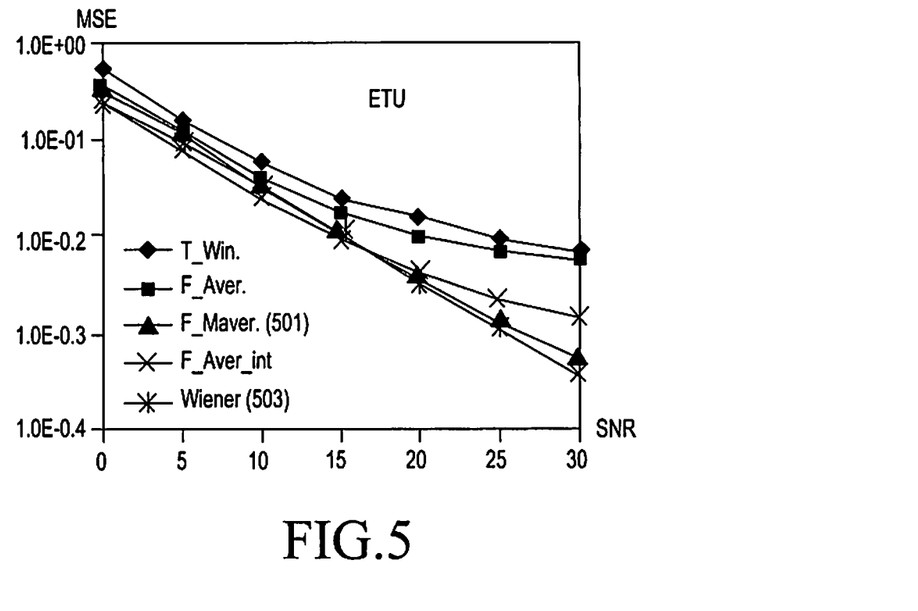
FIGS. 5 to 7 are diagrams illustrating a simulation result of performance of a channel estimating method according to an embodiment of the invention.

FIG. 5 is a diagram comparing MSE performance for each channel estimation scheme in the Extended Typical Urban (ETU) channel, in which the timing offset of 6 RBs is assumed to be set to 0.26 us.

The used channel estimation schemes from top to bottom in FIG. 5 will be described. Referring to FIG. 5, there are illustrated the channel estimation performance in the case where the window T_win is used in the time axis, the case where the block average F_Aver is used in the frequency axis, the case where the moving average F_Maver is used, the case where the inter-block interpolation F_Aver_int is used after the block is averaged, and the case where the Wiener filter is used. In the simulation result illustrated in FIG. 5, the size for performing average in the frequency axis is F_win=3 subcarriers, and when a window is used in the time axis, the window size is assumed to be T_win=10 samples. These numerical values are set to make the main lobe size of the Wiener filter equal to the F_win in the frequency domain in consideration of when a rectangular window in the time domain is subjected to the FFT and converted into the sinc function.

Remarkably, it can be seen that the performance of the frequency estimation scheme 501 for calculating the moving average in the frequency domain according to the embodiment of the present invention is approximated to the performance of the estimation scheme 503 using the ideal Wiener filter.

Figure 6:
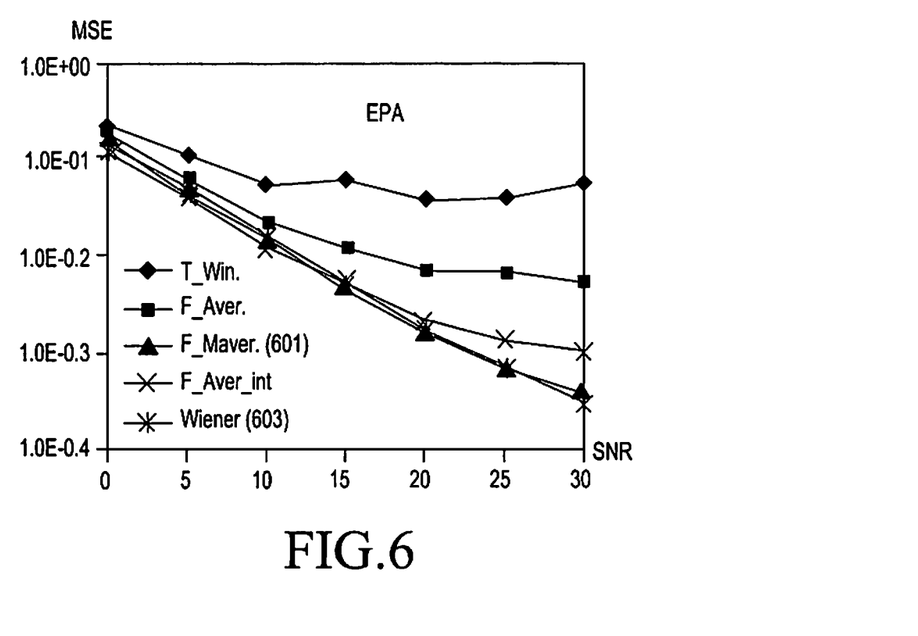

FIG. 6 is a diagram comparing the MSE performance for each channel estimation scheme in the Extended Pedestrian A (EPA) channel. In the simulation result illustrated in FIG. 6, the size for performing average in the frequency axis is F_win=6 subcarriers, and when a window is used in the time axis, the window size is assumed to be T_win=36 samples. It can be seen that since the coherence BW of the EPA channel is larger than that of the ETU channel, when F_win=6, the performance of the channel estimation scheme 601 using the moving average according to the embodiment of the present invention is approximated to that of the channel estimation scheme 603 using the ideal Wiener filter. Therefore, the channel estimation performance which is approximated to the ideal Wiener filter can be obtained when the moving average is employed to simplify the structure of the channel estimation apparatus and a scheme is employed which adjusts the window size according to a delay spread of the channel and the received SNR.

Figure 7:
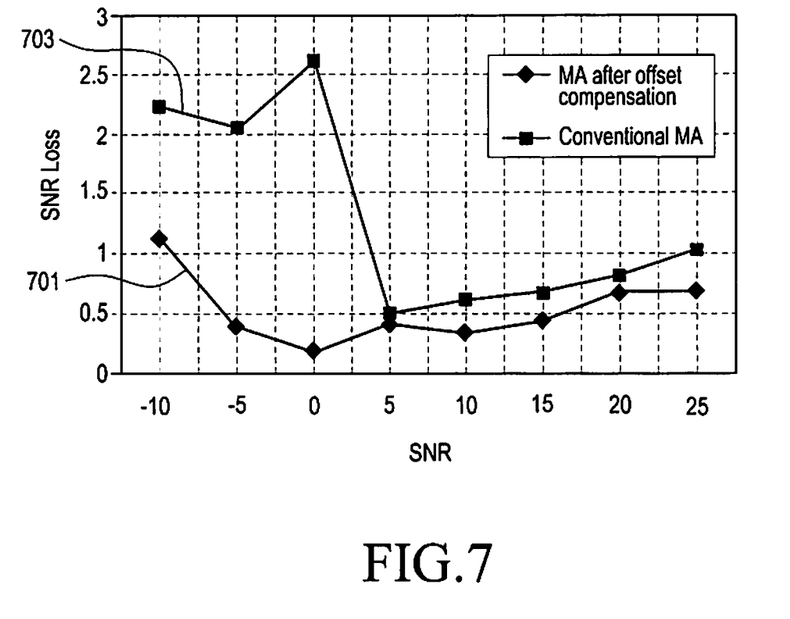

FIG. 7 is a diagram illustrating another simulation result of performance of a channel estimating method according to an embodiment of the invention.

For example, in FIG. 7, assuming that the timing offsets of 56 samples are generated when 2048 FFTs are used in the AWGN environment, the phase variation is generated in the frequency domain, so that a phase difference is generated in the k-th subcarrier by $e^{-j2\pi k 56/2048}$. When the moving average is performed by 3 tones in the channel estimation, there will be described the difference between the case 701 where the timing offset compensation according to the present invention is performed and the case 703 where the timing offset compensation is not performed.

First, the channel estimation results H(0), H(1) and H(2) of three received subcarriers are as follows.

$$H(0) = 1 + n_0$$

$$H(1) = e^{-j2\pi 56/2048} + n_1$$

$$H(2) = e^{-j2\pi 112/2048} + n_2$$

In the case 703 where the timing offset compensation according to the present invention is not performed, the average value of the channels of three subcarriers is as follows.

$$H_{avg} = \frac{1 + e^{-j2\pi k 56/2048} + e^{-j2\pi k 112/2048}}{3} + \frac{n_0 + n_1 + n_2}{3}$$

Further, in the case 701 where the timing offset compensation according to the present invention is performed, the average value of the channels of three subcarriers is as follows.

$$H(0)e^{j2\pi 0/2048} = 1 + n_0$$

$$H(1)e^{j2\pi 56/2048} = 1 + n_1 e^{j2\pi 56/2048}$$

$$H(2)e^{j2\pi 112/2048} = 1 + n_2 e^{j2\pi 112/2048}$$

$$H_{avg} = 1 + \frac{n_0 + n_1 e^{-j2\pi 56/1024} + n_2 e^{-j2\pi 112/1024}}{3}$$

Therefore, referring to FIG. 7, when the channel estimation is performed using the timing offset compensation according to the present invention, it can be seen that the SNR loss is reduced remarkably.

As described above, when the channel estimation method according to the present invention is applied, the channel estimation performance can be achieved which approaches to the performance of the Wiener filter using the moving average scheme. Further, the filtering can be performed appropriately in every environment by changing the window size simply when the moving average is performed without applying separate filter coefficients according to the channel feature variation. Further, the degradation in the channel estimation performance can be minimized by compensating the timing offset even when the timing offset exists severely or the channel has a large RMS delay. Moreover, when the pilot signals are received over the entire frequency range just like the uplink of the LTE system, the efficiency of the channel estimation performance can be maximized.

While the invention has been shown and described with reference to certain embodiments thereof, it will be understood by those skilled in the art that various changes in form and details may be made therein without departing from the spirit and scope of the invention as defined by the appended claims.

What is claimed is:
1. A method of estimating a channel in a wireless communication system, the method comprising:
   obtaining a channel impulse response from a pilot signal included in a received signal;

estimating an index of a main signal path with a maximum peak power value for the channel impulse response in an effective window section, which is set based on the channel impulse response;

determining a timing offset with the maximum peak power value for the channel impulse response;

performing a phase compensation using the determined timing offset, wherein performing the phase compensation further comprises performing the phase compensation in a frequency domain using the index of the main signal path with the maximum peak power value;

estimating a channel to which the compensated phase was applied; and outputting a channel estimation value in which the channel estimate with the compensated phase is restored to the original phase.

2. The method of claim 1, wherein the effective window section is set by being divided into a left window section and a right window section based on the channel impulse response in consideration of an estimation error in the timing offset.

3. The method of claim 1, wherein determining the timing offset further comprises:

estimating the timing offset;

comparing the maximum peak power value with a predetermined threshold value; and estimating the timing offset by determining the maximum peak power value as an effective value when the maximum peak power value is greater than the threshold value as the comparing result.

4. The method of claim 3, wherein the threshold value is set to a value greater than an average noise power value.

5. The method of claim 1, wherein the phase compensation is performed for each subcarrier.

6. The method of claim 1, wherein estimating the channel further comprises:

determining a window size for the channel estimation in a variable manner; and performing channel estimation by obtaining a moving average using the window for the result of the phase compensation.

7. The method of claim 6, wherein the window size is determined in the variable manner using at least one of a Carrier to Interference Noise Ratio (CINR), a channel Root Mean Square (RMS) delay and a frequency selectivity.

8. An apparatus for estimating a channel in a wireless communication system, the apparatus comprising:

an Inverse Discrete Fourier Transform (IDFT) unit which obtains a channel impulse response from a pilot signal which is included in a received signal;

a timing offset estimator which estimates an index of a main signal path with a maximum peak power value for the channel impulse response in an effective window section, which is set based on the channel impulse response, and determines a timing offset corresponding to the estimated index of the main signal path;

a timing offset compensator which performs a phase compensation using the estimated timing offset and performs the phase compensation in a frequency domain using the index of the main signal path with the maximum peak power value;

a moving averaging unit which performs a channel estimation to which the compensated phase was applied; and a timing offset decompensator which outputs a channel estimation value in which the channel estimate with the compensated phase is restored to the original phase.

9. The apparatus of claim 8, wherein the timing offset estimator is further configured to set the effective window section by dividing the section into a left window section and a right window section on the basis of the channel impulse response in consideration of an estimation error in the timing offset.

10. The apparatus of claim 8, wherein the timing offset estimator is further configured to compare the maximum peak power value with a predetermined threshold value, and estimates the timing offset by determining the maximum peak power value as an effective value when the maximum peak power value is greater than the threshold value as the comparing result.

11. The apparatus of claim 10, wherein the threshold value is set to a value greater than an average noise power value.

12. The apparatus of claim 8, wherein phase compensation is performed for each subcarrier.

13. The apparatus of claim 8, wherein the moving averaging unit is further configured to determine a window size for the channel estimation in a variable manner, and perform the channel estimation by obtaining a moving average using the window for the result of the phase compensation.

14. The apparatus of claim 13, wherein the moving averaging unit is further configured to determine the window size in the variable manner using at least one of a Carrier to Interference Noise Ratio (CINR), a channel Root Mean Square (RMS) delay and a frequency selectivity.

* * * * *